(12) United States Patent
Jung et al.

(10) Patent No.: US 7,821,592 B2
(45) Date of Patent: Oct. 26, 2010

(54) LIQUID CRYSTAL DISPLAY MODULE HAVING TOP CASE WITH AN IC SPACED WITHIN A HOLE THEREIN AND WHEREIN A CONTACT SURFACE BETWEEN A SUPPORT MAIN AND A FIRST SUBSTRATE OVERLAPS A SECOND SUBSTRATE OF THE LCD

(75) Inventors: Yong-Chae Jung, Daegu (KR); Sang-Jin Nam, Cheongju-si (KR)

(73) Assignee: LG Display Co., Ltd., Seoul (KR)

( * ) Notice: Subject to any disclaimer, the term of this patent is extended or adjusted under 35 U.S.C. 154(b) by 355 days.

(21) Appl. No.: 11/967,775

(22) Filed: Dec. 31, 2007

(65) Prior Publication Data
US 2009/0091680 A1     Apr. 9, 2009

(30) Foreign Application Priority Data
Oct. 5, 2007     (KR) ...................... 10-2007-0100231

(51) Int. Cl.
*G02F 1/1333*     (2006.01)
(52) U.S. Cl. ...................................................... 349/58

(58) Field of Classification Search ............. 349/58–60, 349/161
See application file for complete search history.

(56) References Cited
U.S. PATENT DOCUMENTS

| 2006/0176417 A1* | 8/2006 | Wu et al. ....................... 349/58 |
| 2007/0171353 A1* | 7/2007 | Hong .......................... 349/161 |

* cited by examiner

*Primary Examiner*—John Heyman
(74) *Attorney, Agent, or Firm*—Birch Stewart Kolasch & Birch, LLP

(57) ABSTRACT

A liquid crystal display module includes a bottom cover, a support main over the bottom cover, a backlight unit surrounded by the support main, a liquid crystal panel over the backlight unit and including first and second substrates and a liquid crystal layer interposed between the first and second substrates, a driving unit including a first driving integrated circuit (IC) that is mounted on a first side of the first substrate, and a case top covering edges of a front surface of the liquid crystal panel and combined with the bottom cover, the case top including a first hole corresponding to the driving IC.

9 Claims, 4 Drawing Sheets

LIQUID CRYSTAL DISPLAY MODULE HAVING TOP CASE WITH AN IC SPACED WITHIN A HOLE THEREIN AND WHEREIN A CONTACT SURFACE BETWEEN A SUPPORT MAIN AND A FIRST SUBSTRATE OVERLAPS A SECOND SUBSTRATE OF THE LCD

The present invention claims the benefit of Korean Patent Application No. 10-2007-100231 filed in Korea on Oct. 5, 2007, which is hereby incorporated by reference.

BACKGROUND OF THE INVENTION

1. Field of the Invention

The present invention relates to a liquid crystal display (LCD) module, and more particularly, to an LCD module including chip-on-glass-type driving integrated circuits.

2. Discussion of the Related Art

LCD devices make use of optical anisotropy and polarization properties of liquid crystal molecules to produce images. Specifically, since the liquid crystal molecules have a definite alignment as a result of their long, thin shapes and are arranged to have initial pre-tilt angles, an alignment direction of the liquid crystal molecules can be controlled by applying an electric field. Accordingly, variations in the applied electric field influence the alignment of the liquid crystal molecules. Due to the optical anisotropy, the refraction of incident light depends on the alignment direction of the liquid crystal molecules. Thus, by properly controlling the applied electric field, an image that has a desired brightness can be produced.

An LCD device includes a liquid crystal panel for displaying images, a backlight unit for supplying the liquid crystal panel with light, and a driving unit for providing signals to the liquid crystal panel and the backlight unit.

The driving unit includes a plurality of driving integrated circuits (ICs) and printed circuit boards (PCBs). The driving ICs may be packaged to the liquid crystal panel by a tape automated bonding (TAB) method, a chip on glass (COG) method or a chip on film (COF) method.

Among the methods, in the COG method, since a chip of the driving IC is directly mounted on a substrate, a COG-type driving IC has finer pitches than other type driving ICs. Therefore, a packaging area may be minimized, and a thin device can be produced. Accordingly, the COG method has been widely used for potable devices or mobile communication devices.

A related art LCD module including a COG-type driving IC will be described hereinafter in detail with reference to FIGS. 1 and 2.

FIG. 1 is a top plan view of illustrating a related art LCD module including a COG-type driving IC. FIG. 2 is a cross-sectional view of illustrating a part of the related art LCD module and corresponding to the line II-II of FIG. 1.

In FIGS. 1 and 2, the related art LCD module includes a liquid crystal panel 10, a backlight unit 20, a driving unit 30, a case top 40, a support main 50 and a bottom cover 60.

The liquid crystal panel 10 includes a lower substrate 12 and an upper substrate 14, and a liquid crystal layer (not shown) is interposed between the substrates 12 and 14. A lower polarizer 15 is disposed under the lower substrate 12, and an upper polarizer 16 is disposed over the upper substrate 14.

The backlight unit 20 is disposed under the liquid crystal panel 10. The backlight unit 20 includes a lamp (not shown) and a plurality of optical sheets.

The driving unit 30 includes a driving IC 32 and a PCB 34. The driving IC 32 is directly mounted on the lower substrate 12 by a COG method. The PCB 32 is bent toward a rear side of the liquid crystal panel 10.

The support main 50 surrounds sides of the backlight unit 20, and the support main 50 is set on the bottom cover 60. The bottom cover 60 is combined with the case top 40 over the liquid crystal panel 10 to protect and support the liquid crystal panel 10, the backlight unit 20 and the driving unit 30.

In addition, the case top 40 covers edges of a front surface of the liquid crystal panel 10, especially, edges of a front surface of the upper polarizer 16, and exposes the front surface of the liquid crystal panel 10 through an opening. The case top 40 also covers the driving IC 32.

As stated above, the COG method has been widely used for potable devices or mobile communication devices, and for convenience of carrying, the devices have been required to get thinner and light-weighted. To do this, various methods for reducing a thickness and a weight of the LCD modules have been developed by reducing thicknesses of the upper and lower substrates 14 and 12 of the liquid crystal panel 10, a light guide panel and the optical sheets of the backlight unit 20, or elements of the driving unit 30.

As the thickness of the LCD module gets thin, the case top 40 is lowered with respect to the bottom cover 60. Therefore, distances from the case top 40 to other components of the LCD module also become short. Specially, as thicknesses of the upper substrate 14 and the upper polarizer 16 get thin, a distance between the case top 40 and the lower substrate 12 becomes short.

By the way, in the LCD module including a COG-type driving IC, since the driving IC 32 is directly mounted on the lower substrate 12 of the liquid crystal panel 10, a lower surface of the case top 40 may contact a top surface of the driving IC 32 as the thicknesses of the upper substrate 40 and the upper polarizer 16 get thin. The contact of the case top 40 and the driving IC 32 may cause cracks and wrong operation of the driving IC 32.

To prevent the driving IC 32 from contacting the case top 40, the driving IC 32 may have a thinner thickness than the related art. However, this requires an additional grinding process or a larger-sized driving IC as compared to the related art and results in increasing costs.

Alternatively, the thickness of the LCD module may be decreased by disposing an end of the case top 40 on the lower substrate 12 such that the case top 40 does not cover the driving IC 32 and exposes the upper substrate 14, the upper polarizer 16 and the driving IC 32. However, in this case, there is a problem that the LCD device cannot be protected from vibrations or impacts.

SUMMARY OF THIS INVENTION

Accordingly, the present invention is directed to an LCD module that substantially obviates one or more of the problems due to limitations and disadvantages of the related art.

An object of the present invention is to provide an LCD module having a relatively thin thickness without limitation on a thickness of a COG-type driving IC.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a liquid crystal display module includes a bottom cover, a support main over the bottom cover, a backlight unit surrounded by the support main, a liquid crystal panel over the backlight unit and including first and second substrates and a liquid crystal layer interposed between the first and second substrates, a driving unit including a first driving integrated circuit (IC) that is mounted on a first side of the first substrate, and a case top covering edges of a front surface of the liquid crystal panel and combined with the bottom cover, the case top including a first hole corresponding to the driving IC.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Reference will now be made in detail to preferred embodiments of the present invention, examples of which are illustrated in the accompanying drawings.

Figure 1:
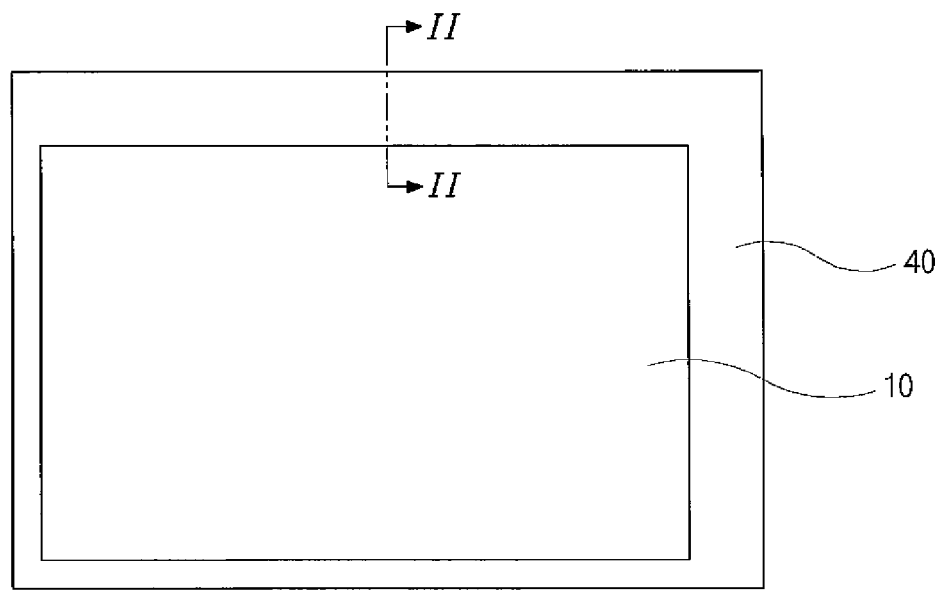
FIG. 1 is a top plan view of illustrating a related art LCD module including a COG-type driving IC.
Figure 2:
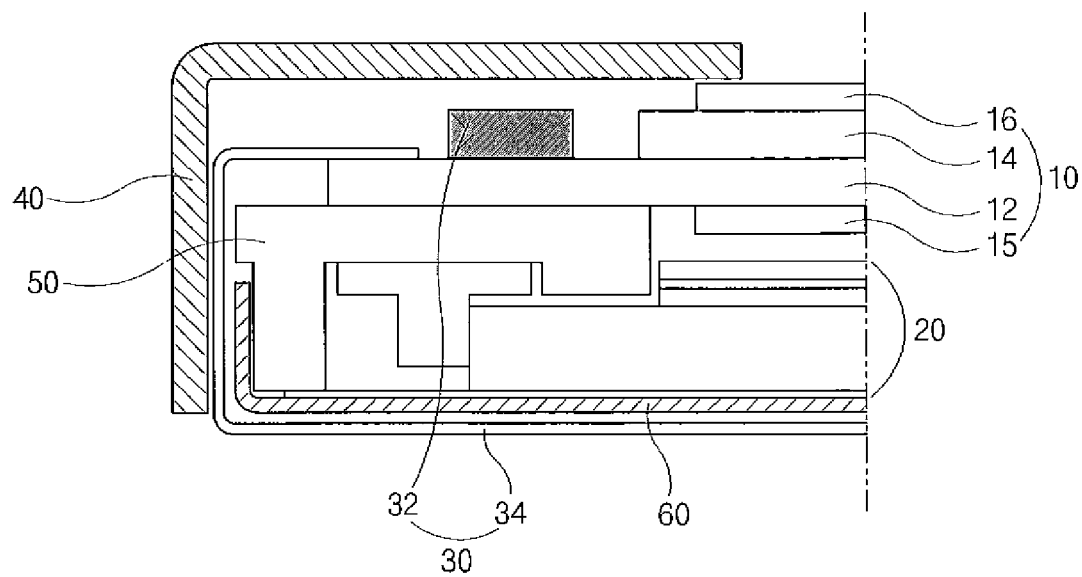
FIG. 2 is a cross-sectional view of illustrating a part of the related art LCD module and corresponding to the line II-II of FIG. 1.
Figure 3:
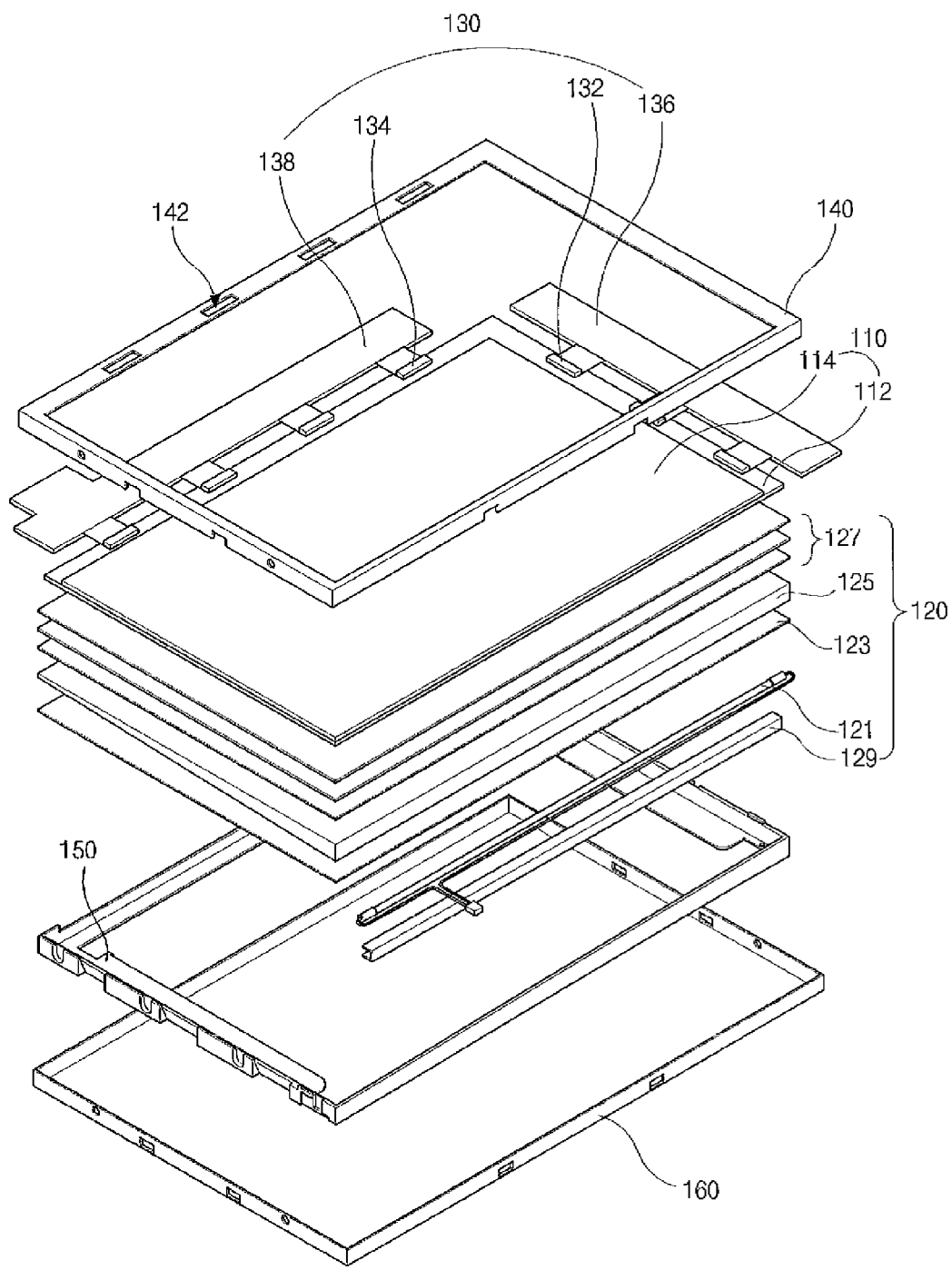
FIG. 3 is a perspective view of illustrating an LCD module including a COG-type driving IC according to an embodiment of the present invention.

FIG. 3 is a perspective view of illustrating an LCD module including a COG-type driving IC according to an embodiment of the present invention.

In FIG. 3, the LCD module includes a liquid crystal panel 110, a backlight unit 120, a driving unit 130, a case top 140, a support main 150 and a bottom cover 160.

The liquid crystal panel 110 includes a lower substrate 112 and an upper substrate 114, and a liquid crystal layer (not shown) is interposed between the substrates 112 and 114.

Although not shown in the figure, gate lines and data lines are formed on an inner surface of the lower substrate 112 and cross each other to define pixel regions. A thin film transistor and a pixel electrode are disposed at each pixel region and are electrically connected to the gate and data lines. The lower substrate 112 including the elements may be referred to as an array substrate.

In addition, although not shown in the figure, a black matrix, a color filter layer and a common electrode are formed on an inner surface of the upper substrate 114. The black matrix has openings corresponding to the pixel regions, and red, green and blue color filter patterns of the color filter layer are sequentially disposed in the openings of the black matrix. The common electrode covers the black matrix and the color filter layer. The common electrode and the pixel electrode constitute a liquid crystal capacitor. The upper substrate 114 including the elements may be referred to as a color filter substrate.

The upper substrate 114 has a smaller size than the lower substrate 112 to partially expose the lower substrate 112.

The liquid crystal panel 110 further includes a lower polarizer (not shown) and an upper polarizer (not shown) on outer surfaces of the lower substrate 112 and the upper substrate 114, respectively.

The backlight unit 120 is disposed under the liquid crystal panel 110 and provides light to the liquid crystal panel 110. The backlight unit 120 includes a lamp 121, a reflecting plate 123, a light guide plate 125, and optical sheets 127.

The lamp 121 is a light source and is disposed at a side of the light guide plate 125. The lamp 121 may be one of a cold cathode fluorescent lamp or an external electrode fluorescent lamp. Alternatively, the lamp 121 may be a light-emitting diode lamp.

The lamp 121 is surrounded by a lamp guide 129. The lamp guide 129 is opened at the side of the light guide plate 125, and thus light directly emitted from the lamp 121 or reflected at the lamp guide 129 from the lamp 121 progresses toward the light guide plate 125.

The light guide plate 125 changes a line light source of the lamp 121 into a surface light source corresponding to a substantially entire surface of the liquid crystal panel 110. The light guide plate 125 may have predeterminately-shaped patterns at a rear surface to provide a uniform surface light source.

The reflecting plate 123 is disposed at the rear surface of the light guide plate 125. The reflecting plate 123 reflects light passing through the rear surface of the light guide plate 125 towards the liquid crystal panel 110.

The optical sheets 127 over the light guide plate 125 condense and diffuse light passing through the light guide plate 125.

The driving unit 130 is connected to the lower substrate 112 of the liquid crystal panel 110. The driving unit 130 includes gate driving ICs 132 and data driving ICs 134, a gate PCB 136 and a data PCB 138.

The gate driving ICs 132 and the data driving ICs 134 are directly mounted on exposed two sides of the lower substrate 112 adjacent to each other, respectively by a COG method. The gate driving ICs 132 are connected to the gate lines and the gate PCB 136, and the data driving ICs 134 are connected to the data lines and the data PCB 138. Additionally, the gate PCB 136 and the data PCB 138 are electrically connected to each other. Here, the gate PCB 136 may be omitted, and the gate driving ICs 132 may be directly connected to the data PCB 138.

The case top 140 includes an upper surface and a side surface. The upper surface of the case top 140 covers edges of a front surface of the liquid crystal panel 110 and includes an opening exposing the front surface of the liquid crystal panel 110. The upper surface of the case top 140 further includes a plurality of holes 142 corresponding to the data driving ICs 134 at one side.

The support main 150 is disposed on the bottom cover 160 and combined with the bottom cover 160. Moreover, the backlight unit 120 and the liquid crystal panel 110 are disposed over the support main 150, and the support main 150 surrounds sides of the backlight unit 120. As shown in the figure, the support main 150 is a rectangular-shaped frame. However, the shape of the support main 150 is not limited to the shape shown in the figure and may be different. For example, one side of the support main 150 may be opened, wherein the bottom cover 160 may have a shape corresponding to the opened side of the support main 150.

The bottom cover 160 is combined with the case top 140 to fix, support and protect the liquid crystal panel 110 and the backlight unit 120.

At this time, the gate and data PCBs 136 and 138 of the driving unit 130 may be folded toward a rear surface of the bottom cover 160 and may be disposed on the rear surface of the bottom cover 160.

Here, the case top 140 may be referred to as a top case or a top cover. The support main 150 may be referred to as a main support. The bottom cover 160 may be referred to as a cover bottom.

The case top of the present invention will be described in more detail with reference to FIGS. 4 and 5.

Figure 4:
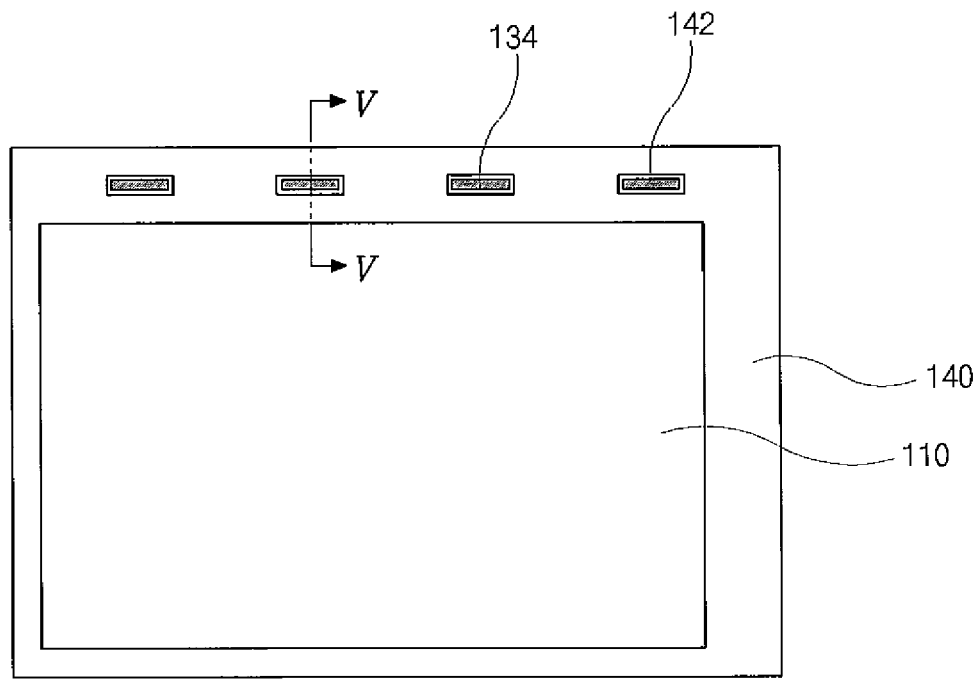
FIG. 4 is a top plan view of illustrating the LCD module of FIG. 3.

FIG. 4 is a top plan view of illustrating the LCD module of FIG. 3. FIG. 5 is a cross-sectional view of illustrating a part of the LCD module and corresponding to the line V-V of FIG. 4.

Figure 5:
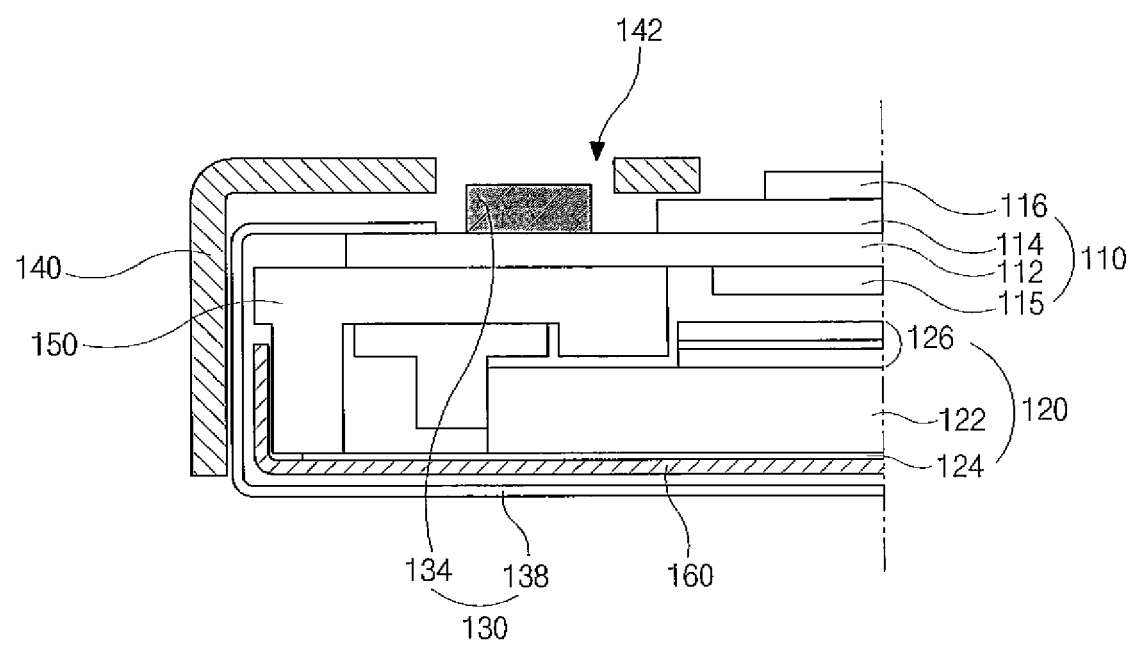
FIG. 5 is a cross-sectional view of illustrating a part of the LCD module and corresponding to the line V-V of FIG. 4.

In FIGS. 4 and 5, the support main 150, the backlight unit 120 and the liquid crystal panel 110 are sequentially disposed on the bottom cover 160. Next, the case top 140 is disposed on the liquid crystal panel 110. The case top 140 is combined with the bottom cover 160 to fix and protect the liquid crystal panel 110 and the backlight unit 120.

As mentioned above, the data driving IC 134 is directly mounted on the lower substrate 112 of the liquid crystal panel 110 by a COG method, and the data PCB 138 connected to the data driving IC 134 is disposed at the rear surface of the bottom cover 160.

The case top 140 covers the edges of the front surface of the liquid crystal panel 110. At this time, the end of the case top 140 is disposed on the upper substrate 114 of the liquid crystal panel 110, so that the case top 140 does not overlap the upper polarizer 116 and covers only edges of a front surface of the upper substrate 114. In addition, the case top 140 has the hole 142 corresponding to the data driving IC 134, and a top surface of the data driving IC 134 is disposed in the hole 142 of the case top 140.

In the present invention, a thin and light-weighted LCD module is provided by reducing the thicknesses of the substrates 112 and 114 of the liquid crystal panel 110 as compared with the related art. To do this, after attaching the substrates 112 and 114, and surfaces of the attached substrates 112 and 114 may be cut.

Moreover, as stated above, the case top 140 does not cover the upper polarizer 116. The case top 140 is further lowered with respect to the bottom cover 160 as compared with the related art, and thus the thickness of the LCD module is further reduced by the thickness of the upper substrate 114.

By the way, in this case, the data driving IC 134 is thicker than the upper substrate 114, and a thickness of the data driving IC 134 is larger than a distance between the case top 140 and the lower substrate 112.

Namely, the data driving IC 134 includes a plurality of layers patterned on silicon wafer, and for example, the data driving IC 134 including 21 to 25 layers may have a thickness of about 0.56 mm. On the other hand, the substrates 112 and 114 may have a thickness of about 0.4 nm, which is thinner than the data driving IC 134.

The thickness of the data driving IC 134 is thicker than that of the upper substrate 114. But, the case top 140 has the hole 142 corresponding to the data driving IC 134, and the top surface of the data driving IC 134 is disposed in the hole 142 of the case top 140. Therefore, the data driving IC 134 does not contact the case top 140, thereby preventing cracks and wrong operation of the data driving IC 134.

By considering margins, the hole 142 of the case top 140 has a larger area than the data driving IC 134. For example, it is desirable that a difference between a width of the hole 142 and a width of the data driving IC 134 is larger than 0 mm and smaller than 0.6 mm.

Moreover, beneficially, the thickness of the data driving ICs 134 is smaller than a sum of the thickness of the case top 140 and the thickness of the upper substrate 114.

Meanwhile, in the embodiment of the present invention, the case top 140 has the holes 142 corresponding to only the data driving ICs 134. This is why the gate driving ICs 132 of FIG. 3 are thinner than the data driving ICs 134 and the gate driving ICs 132 of FIG. 3 do not contact the case top 140.

However, as the thickness of the upper substrate 114 becomes thinner, the gate driving ICs 132 of FIG. 3 also may contact the case top 140.

To prevent this, the case top 140 may further include other holes corresponding to the gate driving ICs 132 of FIG. 3.

Another embodiment of the present invention will be described in more detail with reference to FIG. 6.

Figure 6:
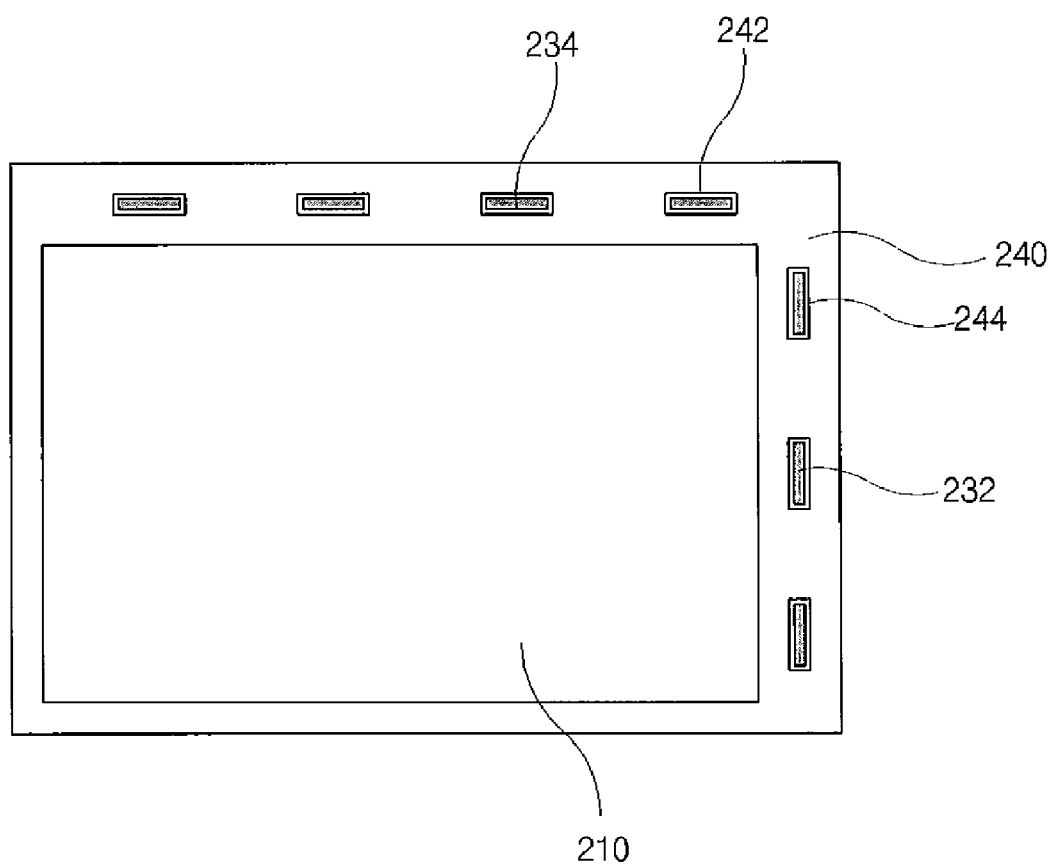
FIG. 6 is a top plan view of illustrating an LCD module including a COG-type driving IC according to another embodiment of the present invention.

FIG. 6 is a top plan view of illustrating an LCD module including a COG-type driving IC according to another embodiment of the present invention. The LCD module of FIG. 6 has the same structure as the above-mentioned LCD module except for the thickness of the upper substrate and a shape of the case top. Additionally, a cross-section of the LCD module of FIG. 6 is the same as FIG. 5 and is not shown, and explanations for the same parts are omitted.

In FIG. 6, the case top 240 is disposed on the liquid crystal panel 210. The case top 240 has the opening exposing the front surface of the liquid crystal panel 210 and covers the edges of the front surface of the liquid crystal panel 210.

In the meantime, the gate driving ICs 232 and the data driving ICs 234 are directly packaged on the liquid crystal panel 210. The case top 240 includes first holes 242 corresponding to the data driving ICs 234 and second holes 244 corresponding to the gate driving ICs 232. Accordingly, the data driving ICs 234 and the gate driving ICs 232 are exposed through the first holes 242 and the second holes 244, respectively. Top surfaces of the data driving ICs 234 and the gate driving ICs 232 are disposed in the first holes 242 and the second holes 244, respectively.

In the present invention, the thickness and weight of an LCD module may be decreased by reducing thicknesses of the substrates of the liquid crystal panel. Here, when the LCD module includes COG-type driving ICs, the case top has holes corresponding to the driving ICs, and the driving ICs do not contact the case top. Accordingly, the cracks and wrong operation of the driving ICs can be prevented. In addition, since the same driving ICs as the related art can be used, an increase in costs can be prevented.

Further, the case top covers the edges of the front surface of the upper substrate, and thus the components of the LCD module can be protected from vibrations or impact.

According to the present invention, a relatively thin LCD module can be provided without limitation on the thickness of the COG-type driving IC.

It will be apparent to those skilled in the art that various modifications and variations can be made in the case top for a liquid crystal display device and a liquid crystal display device including the same of the present invention without departing from the spirit or scope of the invention. Thus, it is intended that the present invention covers the modifications and variations of this invention provided they come within the scope of the appended claims and their equivalents.

What is claimed is:

1. A liquid crystal display module, comprising:
   a bottom cover;
   a support main over the bottom cover;
   a backlight unit surrounded by the support main;
   a liquid crystal panel over the backlight unit, the liquid crystal panel including first and second substrates and a liquid crystal layer interposed between the first and second substrates;
   a driving unit including a first driving integrated circuit (IC) that is mounted on a first side of the first substrate; and
   a case top covering edges of a front surface of the liquid crystal panel and combined with the bottom cover, the case top including a first hole corresponding to the first driving IC,
   wherein there is a gap between facing side surfaces of the first hole and the first driving IC, and
   wherein a contact surface between the support main and the first substrate overlaps the second substrate.

2. The module according to claim 1, wherein a top surface of the first driving IC is disposed in the first hole.

3. The module according to claim 1, wherein the first driving IC has a greater thickness than the second substrate.

4. The module according to claim 1, wherein a width of the first hole is greater than a width of the first driving IC.

5. The module according to claim 4, wherein a difference between the width of the first hole and the width of the first driving IC is larger than 0 mm and smaller than 0.6 mm.

6. The module according to claim 1, wherein the liquid crystal panel further includes first and second polarizers on outer surfaces of the first and second substrates, respectively, and an end of the case top is disposed on the second substrate such that the case top is spaced apart from the second polarizer.

7. The module according to claim 1, wherein the driving unit further includes a second driving IC mounted on a second side of the first substrate, and the case top further includes a second hole corresponding to the second driving IC.

8. The module according to claim 7, wherein the first driving IC is thicker than the second driving IC.

9. The module according to claim 8, wherein the liquid crystal panel further includes gate and data lines on the first substrate, the first driving IC is connected to the data lines, and the second driving IC is connected to the gate lines.

* * * * *